US006403133B1

(12) United States Patent
Barfuss et al.

(10) Patent No.: US 6,403,133 B1
(45) Date of Patent: Jun. 11, 2002

(54) COCOA PRODUCT PREPARATION

(75) Inventors: David L. Barfuss, Worthington; David Klug, Marysville, both of OH (US); Suzanne Stempien, Cicero, NY (US)

(73) Assignee: Nestec S.A., Vevey (CH)

( * ) Notice: Subject to any disclaimer, the term of this patent is extended or adjusted under 35 U.S.C. 154(b) by 9 days.

(21) Appl. No.: 09/597,569

(22) Filed: Jun. 20, 2000

(51) Int. Cl.$^7$ .............................................. A23L 1/277
(52) U.S. Cl. ...................... 426/261; 426/253; 426/593; 426/631
(58) Field of Search ................. 426/593, 660, 426/631, 261, 253

(56) References Cited

U.S. PATENT DOCUMENTS 2,899,309 A * 8/1959 Rushoff ...................... 426/261
3,860,730 A    1/1975 Warkentin ................... 426/174
5,114,730 A * 5/1992 Ellis ............................. 426/593
5,395,635 A    3/1995 Yanamoto et al. .......... 426/331

OTHER PUBLICATIONS

Minifie, B. 1980. Chocolate, Cocoa and Confectionery: Science and Technology, $2^{nd}$ edition, AVI Publishing Co., Inc, Westport, CT, pp. 108–113.*
Brickey, P.M. Jr. et al., "Procedural Change in the Official Method for the Extraction of Light Filth from Cocoa, Chocolate, and Press Cake," *Journal of the AOAC 58:6*, 1975.

* cited by examiner

*Primary Examiner*—Carolyn Paden
(74) *Attorney, Agent, or Firm*—Winston & Strawn

(57) ABSTRACT

A process for lightening the color of cocoa nibs or cocoa liquor which comprises treating the cocoa nibs or cocoa liquor with hydrogen peroxide for a period of time sufficient to lighten the color to the desired level.

15 Claims, No Drawings

COCOA PRODUCT PREPARATION

FIELD OF THE INVENTION

The present invention relates to the preparation of a cocoa product and more particularly to the preparation of cocoa liquor or cocoa nibs having a light color.

BACKGROUND OF THE INVENTION

Nowadays, cocoa beans with the appropriate color for certain applications are becoming increasingly difficult to reliably obtain in sufficient quantities. This is especially the case of providing a consistent and reliable source of light colored cocoa liquor for the production of light milk chocolate. For example, certain beans have been used for the production of light milk chocolate because of their lack of pigmentation relative to other beans. New hybrids are replacing the original varieties, however, and the average color of such beans is becoming darker every year. Thus, there is a need for a lighter colored cocoa liquor, and this need is satisfied by the present invention.

SUMMARY OF THE INVENTION

We have found that the color of cocoa nibs and cocoa liquor from readily available sources of cocoa beans can be reliably lightened by treatment with hydrogen peroxide. This is even more surprising because the hydrogen peroxide does not have a detrimental effect on the flavor of the liquor whereas it would be expected that the use of hydrogen peroxide would cause severe flavor degradation.

Accordingly, the present invention provides a process for lightening the color of cocoa nibs or cocoa liquor which comprises treating the cocoa nibs or cocoa liquor with hydrogen peroxide for a period of time sufficient to lighten the color to the desired level.

DETAILED DESCRIPTION OF THE INVENTION

The hydrogen peroxide is conveniently used as an aqueous solution, e.g., one having a concentration from about 10% to 75%, preferably from 15% to 65% and more preferably from 35% to 50% by weight.

When cocoa nibs are treated, they are advantageously soaked in the hydrogen peroxide solution for a period of time of from about 15 minutes to 3 hours, preferably from 30 minutes to 2 hours. Longer periods of soaking may be employed, e.g., up to as long as 70 hours or more, but although the color is lightened, the flavor may be harmed and the nibs may need deodorizing before use, e.g., by being subjected to a high vacuum. After soaking, the nibs are preferably rinsed with water to remove excess hydrogen peroxide and are then dried. While air drying is uitable, it is advantageous to conduct oven-drying, preferably at a temperature of from about 55° C. to 75° C.

If desired, alkali may be added to the nibs while being soaked to raise the pH. An increase of up to pH 12 helps solubilize the polyphenols. The alkali to be used may conveniently be, for instance, about 0.05N to 0.2N sodium hydroxide. Other common food grade alkali materials may also be used. The cocoa nibs may, if desired, be sonicated during the soaking to break them down. The nibs may also be dutched.

When cocoa liquor is treated, the hydrogen peroxide is added to the cocoa liquor, preferably in an amount of from about 0.1 to 25% by weight based on the cocoa liquor, and is heated to a temperature of from about 50° C. to 120° C. for a period of from about 5 minutes to 5 hours, preferably from 10 mins to 3 hours, with agitation. No separate drying step is ordinarily necessary since the water is evaporated during the treatment step.

The treatment of the cocoa liquor may be carried out in a mixer such as a Lodige mixer, in a water bath or in a kettle cooker.

Preferably, the amount of 30% hydrogen peroxide added to the cocoa liquor is from about 1 to 10% by weight based on the weight of the cocoa liquor. Generally, more hydrogen peroxide is required to achieve the same lightening of color as the concentration of the hydrogen peroxide decreases.

Preferably, the temperature of the treatment of the cocoa liquor is from about 90° C. to 110° C.

We have found that cocoa beans which have undergone a low or half roast give rise to a lighter color of both the nibs and the liquor in the process of the present invention.

The treatment with hydrogen peroxide according to the present invention reduces the microbioal load in the product, especially when the beans have undergone a low or half-roast. The flavor of the cocoa nibs and cocoa liquor treated by the process of the present invention is satisfactory. There is no degradation of the flavor and there are no off-flavors.

The cocoa nibs and cocoa liquor treated by the process of the present invention may be used to prepare a light colored milk chocolate by otherwise conventional methods.

The present invention therefore also provides a process for preparing a light colored milk chocolate which comprises treating cocoa nibs or cocoa liquor with hydrogen peroxide for a period of time sufficient to lighten the color to the desired level, mixing treated cocoa liquor with sugar, milk and cocoa butter and processing. The cocoa liquor used may be cocoa liquor treated directly with hydrogen peroxide or it may be derived from the cocoa nibs treated with hydrogen peroxide which are afterwards ground to form a cocoa liquor.

The present invention therefore further provides a light colored milk chocolate prepared using cocoa nibs or a cocoa liquor treated by the present process.

The milk chocolate prepared using cocoa nibs or a cocoa liquor treated by the process of the present invention has a color and flavor equivalent to a milk chocolate prepared from naturally light-colored cocoa beans.

There is no degradation of the flavor and there are no off-flavors in the milk chocolate prepared using cocoa nibs or a cocoa liquor treated by the process of the present invention.

EXAMPLES

The following Examples further illustrate the present invention. All parts and percentages are given by weight unless otherwise mentioned.

Example 1

2 parts of 30% hydrogen peroxide solution added to 100 parts of Ivory Coast cocoa liquor and heated to 100° C. for 1 hour with stirring. During this time, the water is evaporated and the resulting liquor has a desirable light color. The color of the liquors were compared using a Hunterlab ColorQuest colorimeter where the "L" parameter is a measure of the lightness on a scale of 0 to 100 with 0 being black and 100 being pure white. Before treatment, the Ivory Coast liquor has an L-value of 24.9 and after treatment, it had an L-value of 27.2.

Example 2

Ghana cocoa nibs are soaked in 30% hydrogen peroxide for 30 minutes, rinsed several times with water and divided into two portions, one of which is dried at 65° C. in an oven and the other portion allowed to air dry. Both portions are lighter then the air dried portion and significantly lighter than the starting material.

Example 3

A milk chocolate is prepared by a conventional method using Ivory Coast cocoa liquor treated in accordance with the process described in Example 1.

The milk chocolate thus prepared has a color and flavor equivalent to a milk chocolate prepared from naturally light-colored cocoa beans.

There is no degradation of the flavor and there are no off-flavors.

Example 4

A milk chocolate is prepared by a conventional method using Ghana cocoa nibs treated in accordance with the process described in Example 2.

The milk chocolate thus prepared has a color and flavor equivalent to a milk chocolate prepared from naturally light-colored cocoa beans.

There is no degradation of the flavor and there are no off-flavors.

What is claimed is:

1. A process for lightening the color of cocoa nibs which comprises soaking cocoa nibs in hydrogen peroxide solution for a period of from about 15 minutes to 3 hours.

2. A process according to claim 1 wherein the hydrogen peroxide is used as an aqueous solution having a concentration from about 10 to 75% by weight.

3. A process according to claim 1 wherein, after soaking, the nibs are rinsed with water to remove excess hydrogen peroxide and dried.

4. A process according to claim 1 wherein, after soaking, the nibs are dried.

5. A process according to claim 3 or claim 4 wherein the drying is carried out in an oven.

6. A process for lightening the color of cocoa nibs or cocoa liquor which comprises treating the cocoa nibs or cocoa liquor with hydrogen peroxide for a period of time sufficient to lighten the color to the desired level, wherein cocoa liquor is treated by adding hydrogen peroxide to the liquor, heating to a temperature of from about 50° C. to 120° C. for a period of about 15 minutes to 3 hours with agitation.

7. A process according to claim 6 wherein the temperature of the treatment is from about 90° C. to 110° C.

8. A cocoa nib or cocoa liquor prepared by the process of claim 6.

9. A process for preparing a light colored milk chocolate which comprises treating cocoa nibs or cocoa liquor with hydrogen peroxide for a period of time sufficient to lighten the color to the desired level, grinding the treated cocoa nibs to form a cocoa liquor, mixing treated cocoa liquor with sugar, milk and cocoa butter and processing.

10. A light colored milk chocolate prepared using cocoa nibs or a cocoa liquor treated by a process for lightening the color of cocoa nibs or cocoa liquor which comprises treating the cocoa nibs or cocoa liquor with hydrogen peroxide for a period of time sufficient to lighten the color to the desired level.

11. The light colored milk chocolate made according to the process of claim 10.

12. A process for lightening the color of cocoa nibs or cocoa liquor obtained from cocoa beans which have undergone a low roast, which comprises treating the cocoa nibs or cocoa liquor with hydrogen peroxide for a period of time sufficient to lighten the color to the desired level.

13. The process for lightening the color of cocoa nibs which comprises treating the cocoa nibs by a solution comprising hydrogen peroxide, wherein an alkali is added to the solution while the nibs are being treated with the solution.

14. The process of claim 13, wherein the alkali raises the pH of the solution to up to 12.

15. A process according to claim 13 wherein the hydrogen peroxide is used as an aqueous solution having a concentration from about 10 to 75% by weight.

* * * * *